United States Patent [19]

Metzger

[11] 3,970,560

[45] July 20, 1976

[54] PARTS WASHER

[76] Inventor: Herman U. Metzger, R.R. No. 4, Box 18, Goshen, Ind. 46526

[22] Filed: Sept. 20, 1974

[21] Appl. No.: 507,941

[52] U.S. Cl. .................................. 210/167; 134/111; 210/416 R

[51] Int. Cl.² .......................................... B01D 33/40

[58] Field of Search ........... 210/167, 152, 256, 257, 210/258, 264, 315, 337, 338, 340; 134/111, 102

[56] References Cited

UNITED STATES PATENTS

| | | | |
|---|---|---|---|
| 967,905 | 8/1910 | Hagg | 210/337 X |
| 1,262,495 | 4/1918 | Hills | 210/338 |
| 2,215,018 | 9/1940 | Schmitt | 141/1 |
| 2,422,054 | 6/1947 | Tiger | 210/257 X |
| 2,438,654 | 3/1948 | Albertson | 134/111 |
| 2,484,149 | 10/1949 | Bousky | 134/95 |
| 2,570,021 | 10/1951 | Beach | 134/111 |
| 2,644,472 | 7/1953 | Ward | 134/56 |
| 2,677,381 | 5/1954 | Fisher | 134/111 X |
| 2,897,830 | 8/1959 | Palmer | 134/99 |
| 3,227,167 | 1/1966 | Parent, Jr. | 210/167 X |
| 3,352,310 | 11/1967 | Doyscher | 134/56 |
| 3,363,761 | 1/1968 | Groth et al. | 210/258 X |
| 3,416,544 | 12/1968 | Paiva | 134/111 |
| 3,473,662 | 10/1969 | Kudlaty | 210/258 X |
| 3,522,814 | 8/1970 | Olson | 134/111 |
| 3,630,378 | 12/1971 | Bauman | 210/257 |

*Primary Examiner*—Theodore A. Granger
*Attorney, Agent, or Firm*—Woodard, Weikart, Emhardt & Naughton

[57] ABSTRACT

Apparatus for washing parts such as mechanical parts using a cleaning solvent. A first holding tank containing washing solvent is pressurized causing solvent to flow to a wash area from the first holding tank, and the washing solvent from the washing area is drained into a settling tank arrangement. The settling tank arrangement is a plurality of concentric cylindrical containers positioned one inside another arranged to provide a circuitous path for washing solvent to flow through a series of particulate traps ultimately to a second holding tank. Continuous flow is obtained by providing means for depressurizing the first holding tank and pressurizing the second holding tank, thereby reversing the solvent flow through the system.

8 Claims, 2 Drawing Figures

PARTS WASHER

BACKGROUND OF THE INVENTION

1. Field of the Invention

The invention is in the field of cleaning and liquid contact with solids with liquid-moving recirculation, or flow reversing, and straining means.

2. Description of the Prior Art

Many types of apparatus have been proposed for removing dirt, grease, or particulate matter from different types of parts such as mechanical parts, particularly in the manufacturing and automotive repair fields. Among the apparatus proposed are solvent pump and nozzle systems utilizing solvent recirculation including filter systems for solvent of the type wherein the pumped solvent is forced through a screen type filter. Examples of such devices are shown in U.S. Pat. No. 3,439,689 to Zadron et al. and U.S. Pat. No. 3,679,483 to Zweig.

Other systems provide for dipping parts in the solvent rather than providing circulation and filtering. Various apparatus showing dipping or rotation of parts to be washed in a solvent bath include U.S. Pat. No. 2,808,064 to Kearney, U.S. Pat. No. 3,029,929 to Kearney et al. and U.S. Pat. No. 3,154,084 to McKee.

One common type of apparatus for cleaning mechanical parts is disclosed in U.S. Pat. No. 3,522,814 to Olson. This apparatus is intended for use in mechanical service industries, particularly in automotive parts repair and replacement and like services. In the Olson apparatus, a parts washing area is provided with a filter element positioned beneath the parts washing area through which the used solvent flows into a receptacle from whence it is pumped by a solvent pump back through the parts washing area. In this apparatus, the solvent, as it is used, continuously flows through the filter element and accumulated particles beneath the parts washing area.

SUMMARY OF THE INVENTION

One embodiment of the present invention is a parts washing apparatus comprising a sealed first container, for washing fluid, having a washing fluid outlet, a second container, first conduit means for conveying fluid from the outlet of the first container to a parts washing area when the pressure inside the first container is increased, a receptacle positioned to receive fluid from the first conduit means at the parts washing area, second conduit means for coupling fluid from the receptacle to the second container, and return means for coupling fluid from the second container to the first container.

Another embodiment of the present invention is a parts washing apparatus comprising a first container, for washing fluid, supply means for transferring fluid from the first container to a parts washing area, a first filter tank, positioned to receive fluid from the parts washing area, having an opening in its upper portion, a second filter tank positioned to receive fluid from the opening in the upper portion of the first filter tank, and return means for coupling fluid from the second filter tank to the first container.

It is an object of the present invention to provide a parts washing apparatus operable without a solvent-impelling pump.

It is a further object of the present invention to provide parts washing apparatus having a circuitous path filter trap system for removal of impurities from recirculated solvent in the system.

Further objects and advantages of the present invention shall be apparent from the following detailed description and accompanying figures.

DESCRIPTION OF THE PREFERRED EMBODIMENT

Figure 1:
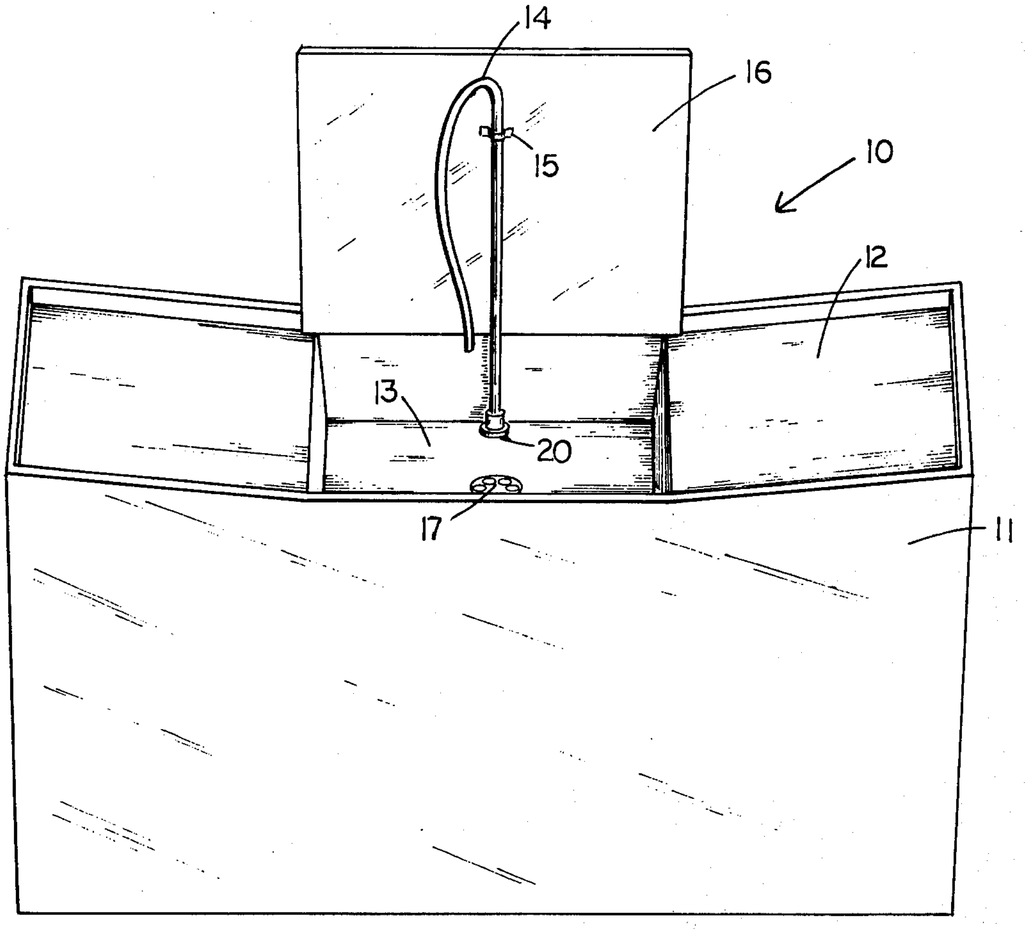
FIG. 1 is an elevated front view of a parts washing apparatus according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring in particular to FIG. 1, there is shown a parts washing apparatus 10 according to the present invention. Apparatus 10 includes a cabinet 11 and a pair of side boards such as 12 sloping into a sink or parts washing area 13. A flexible hose 14 is attached by bracket 15 to back splash lid 16, which is hingedly attached at its bottom to cabinet 11. Flexible hose 14 is coupled from a source of cleaning solvent, as shall be described more particularly hereinafter, and the solvent flows from the end of hose 14 into parts washing area 13, and then through drain 17 to be recirculated, as shall also be described more particularly hereinafter. Drain 17 may be closed to permit filling of parts washing area 13 for soaking parts to be cleaned, or drain 17 may be open to permit solvent to flow from hose 14 over the parts to be cleaned and into drain 17. As mentioned above, side boards 12 are sloped toward sink 13 so that parts rinsed with solvent may be placed on the side boards with solvent draining from the parts on the side boards into sink 13 and then into drain 17.

Figure 2:
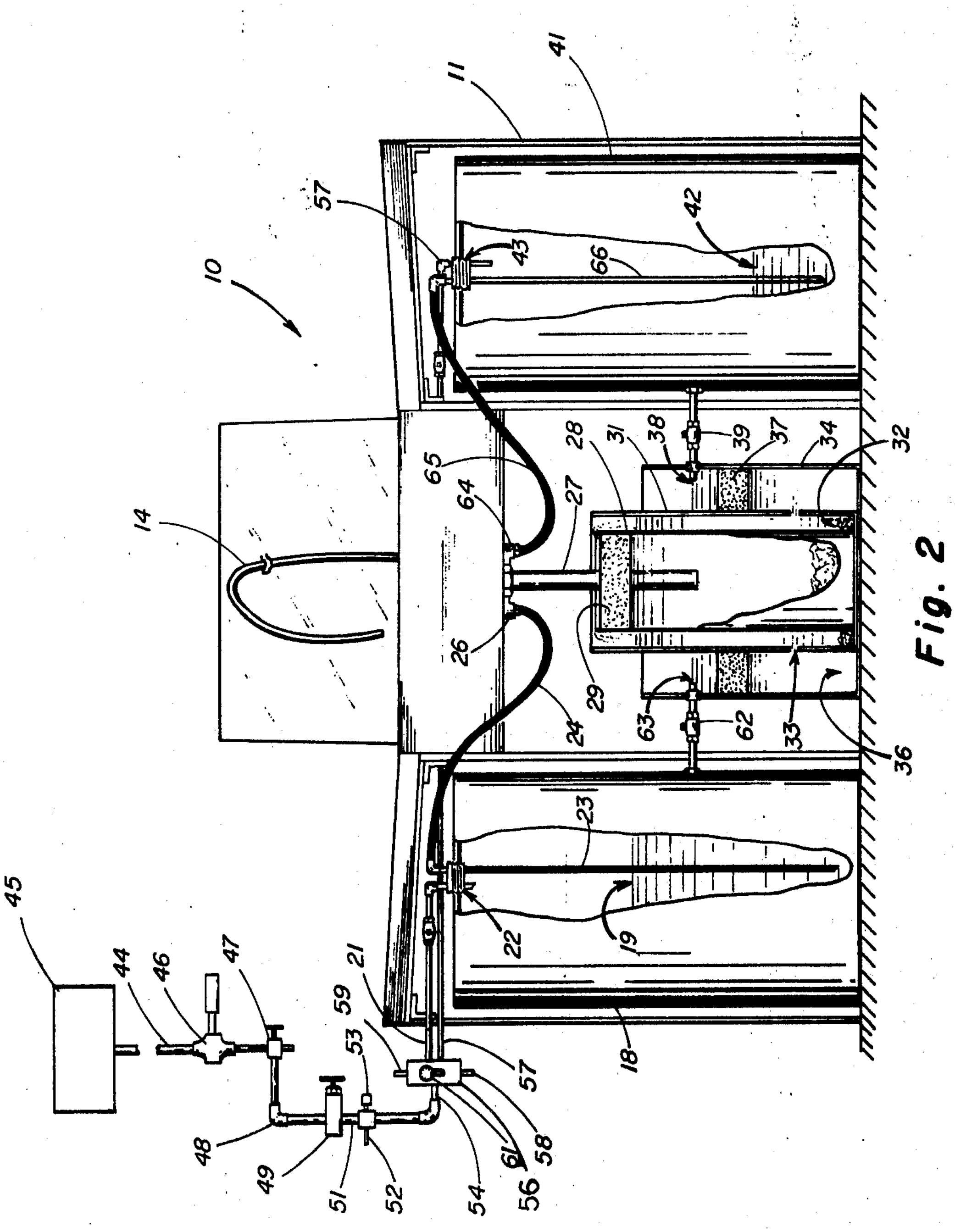
FIG. 2 is a front view, partially in section, and with portions of the tanks removed, of the embodiment of FIG. 1.

Referring now to FIG. 2, parts washing apparatus 10 of FIG. 1 is shown with the front of the cabinet, as well as portions of the solvent receptacles located therein, removed. A first solvent holding tank 18 containing a reservoir 19 of solvent is pressurized through air line 21. Sealed tank 18 is air tight except for plug portion 22 which includes an opening for the end of air line 21 and a second opening for solvent tube 23. Air line 21 is coupled from a source of compressed air, as shall be described hereinafter, and pressurizes the interior of holding tank 18.

The pressure in tank 18 forces solvent from reservoir 19 through solvent tube 23, out of tank 18 and through hose 24. The fluid proceeds through hose 24, check valve 26 and hose 14 into parts washing area 13. One way check valve 26 permits solvent to flow only in the direction from tank 18 toward hose 14 while prohibiting reverse flow.

Solvent from parts washing area 13 is drained through drain 17 which is coupled directly to drain pipe 27. There is gravity feed through drain pipe 27 into a first cylindrical settling tank 28. Particulate matter and other heavier-than-solvent debris is therefore directed toward the bottom of settling tank 28 while the solvent level rises as further solvent drains into the tank 28. A filter element containing a filtration material such as cheese cloth or muslin is mounted in the top of settling tank 28, and as solvent accumulates in tank 28, it is forced through filter element 29 and spills over the top edge of tank 28 into an outer concentric cylindrical settling tank 31.

Settling tank 31 is slightly taller than tank 28 so that all of the solvent flowing through filter 29 and out of tank 28 is received within tank 31. Tank 31 has an annular trap portion 32 at its bottom into which any remaining heavier-than-solvent matter is directed as the solvent spills into tank 31. The solvent level increases in tank 31 up to the level of a ring of a plurality of perforations such as 33 which communicate with the interior of a third concentric cylindrical settling tank 34. Tank 34 receives solvent from tank 31 through perforations 33, with another annular particulate matter trap 36 being provided about its base. Solvent flowing from tank 31 into outer settling tank 34 rises to the level of a filter element 37, which contains filtration material similar to that in filter element 29. Filter element 37 is mounted between the inner wall of tank 34 and the outer wall of tank 31 as shown, and as the level of the solvent rises in tank 34, solvent is filtered through filter element 37 and rises to the level of outlet 38.

Piping couples solvent through outlet 38 to swing check valve 39 and thence into a second holding tank 41. The operation of swing valve 39 shall be discussed more fully hereinafter. A second solvent reservoir 42 of filtered solvent from the settling tanks accumulates in holding tank 41 for future use. Holding tank 41 is identical to holding tank 18, including a top plug 43 having an opening for a solvent tube and an opening for an air tube.

The air pressure system for the apparatus in FIG. 2 is shown in diagrammatic form. An air line 44 is coupled from a source of compressed air 45 and terminates at junction 46. A water trap and drain 47 are provided to prevent the entry of water into the solvent system of apparatus 10. The compressed air from line 44 is coupled through line 48 to pressure regulator 49, which is set to provide at its output five pounds per square inch air pressure. This 5 psi output is coupled through line 51 to a relief valve 52 which includes a pressure indicator gauge 53. The 5 psi compressed air is applied through pressure valve 52 and line 54 to a four way valve 56.

Four way valve 56 is preferably a spring-centered neutral valve such as a type M174-336-43 manufactured by Bellows-Valvair of Akron, Ohio, provided in a configuration that the inlet to the valve is blocked and both cylinder ports are open to exhaust when the valve is in the neutral position. In operation, valve 56 has three settings, as determined by the positioning of valve control handle 61. In a first position, compressed air from input line 54 is coupled through valve 56 to air line 21 and then into holding tank 18. With valve 56 in this position, air line 57, which extends into holding tank 41, is vented through valve 56 and exhaust port 58 to the outside atmosphere. Therefore, when air line 21 is pressurized, air line 57 provides a means for equalizing the pressure within tank 41 and the outside atmosphere. The air in holding tank 41 communicates with the outside air through air line 57 which extends through plug 43 and then through valve 56 and exhaust port 58.

Similarly, when control 61 of valve 56 is in a second position, pressurized air is coupled from air line 54 through valve 56 into air line 57 and holding tank 41. With control 61 in this position, the inside air within holding tank 18 is in free communication with the outer atmosphere through line 21, valve 56 and exhaust port 59. When control 61 is in its third, or neutral, position, both air lines 21 and 57 couple the interior of their respective holding tanks to the outside atmosphere through exhaust ports 59 and 58, respectively.

As can be seen, in the description of flow above, the pressurized flow of solvent from holding tank 18 to parts washing area 13, and the gravity flow from the parts washing area to holding tank 41, is not opposed by air pressure in line 57 since, when air line 21 is pressurized, air line 57 vents the air in tank 41 to the atmosphere through valve 56 and exhaust port 58. Therefore, as the solvent reservoir 42 rises in holding tank 41, the air displaced within holding tank 41 is expelled through air line 57 into the atmosphere.

The flow of solvent from outer settling tank 34 to the holding tanks 18 and 41 is also controlled by the air pressure switching of valve 56. In the flow described above from tank 18 to tank 41, tank 18 is pressurized through line 21, and the pressure in tank 18 maintains swing check valve 62 in a closed position. The closing of swing check valve 62 prohibits flow of solvent in settling tank 34 through outlet 63 and into tank 18. Valve 62 is of the type which permits no flow in the direction from tank 18 to tank 34 but only from tank 34 to tank 18, and then only when the pressure within tank 18 does not maintain valve 62 in a closed position. Swing check valve 39 between outlet 38 in settling tank 34 and holding tank 41 is identical to swing check valve 62 and operates in an analogous fashion. When holding tank 41 is pressurized through air line 57, the pressure within tank 41 maintains swing check valve 39 closed. When air line 57 is vented through vent 58 in valve 56, then solvent flow may occur from settling tank 34 through valve 39 into holding tank 41. As indicated in regard to valve 62, valve 39 does not permit flow from holding tank 41 into settling tank 34 but only in the opposite direction.

Further valving in apparatus 10 is in the solvent hose lines 65 and 24 extending from tanks 41 and 18, respectively. As described above, solvent flow from within holding tank 18 occurs through fluid tube 23 and hose 24 through a check valve 26 and then through hose 14. The outputs of check valves 26 and 64 are coupled together in a T fitting directly beneath fitting 20 (FIG. 1). When solvent is flowing from tank 18 through hose 24 and check valve 26, it is free to flow only through hose 14 and is prohibited from entering hose 65 by check valve 64. Similarly, check valve 26 prohibits fluid flow from hose 65 from entering hose 24 when tank 41 is pressurized and solvent is flowing from solvent tube 66 through hose 65 to hose 14.

In the system as described above, it can be seen that continuous solvent flow is available at parts washing area 13 through hose 14. With the control 61 of four way valve 56 in its first position, as discussed above, holding tank 18 is pressurized and solvent is forced through hose 24 to hose 14, and drained through the settling tanks and into holding tank 41. When the solvent level in holding tank 18 falls below the inlet in solvent tube 23, or sooner if desired, control 61 on four way valve 56 is moved to its second position, which depressurizes holding tank 18 through air line 21 and exhaust port 58, opens swing check valve 62, and terminates further solvent flow through hose 24. Simultaneously with the venting of holding tank 18, holding tank 41 is pressurized through air line 57, closing swing check valve 39 to prevent further flow from settling tank 34, and forcing solvent in holding tank 41 into the inlet of solvent tube 66 and through hose 65 and check valve 64 to hose 14. As described above, the flow of solvent through check valve 64 is directed solely through hose 14 since solvent is unable to flow in a reverse direction through the check valve 26 arrested with hose 24. In practice, the interruption in solvent flow is momentary, a matter of a few seconds, and filtered solvent is flowing from holding tank 41 through the system of settling tanks, as described above, through valve 62, and into holding tank 18.

As mentioned above, the third, or neutral, position for four way valve control 61 is such that the input from line 54 is blocked and both holding tanks 18 and 41 are vented to the atmosphere. Thereby pressure is maintained in the tanks in the system only during the operation of apparatus 10. The solvent used in parts washing apparatus 10 is preferably an aliphatic solvent such aS Amsco Mineral Spirits 66/3 of the Union Oil Company of California.

While there have been described above the principles of this invention in connection with specific apparatus, it is to be clearly understood that this description is made only by way of example and not as a limitation in the scope of the invention.

What is claimed is:

1. Parts washing apparatus comprising:

a sealed first container, for washing fluid, having a washing fluid outlet;

a sealed second container for washing fluid having a washing fluid outlet;

means to selectively provide simultaneous air pressure within said first container and a vent to atmosphere of said second container and simultaneous air pressure within said second container and a vent to atmosphere of said first container;

first conduit means constructed and arranged to deliver fluid from the outlet of the first container to a parts washing area comprising a sink with a drain when the pressure inside the first container is increased;

a filter apparatus for the washing fluid having an inlet end coupled to the sink drain and having an outlet end;

second conduit means coupling fluid from the filter apparatus outlet end to the second container;

third conduit means constructed and arranged to deliver fluid from the outlet of the second container to the parts washing area when the pressure inside the second container is increased; and fourth conduit means coupling fluid from the filter apparatus outlet end to the first container.

2. The apparatus of claim 1 in which the second conduit means includes first valve means for permitting the coupling of washing fluid only in the direction from the filter apparatus outlet end to the second container and only when the second container is vented to atmosphere, and in which the fourth conduit means includes second valve means for permitting the coupling of washing fluid only in the direction from the filter apparatus outlet end to the first container and only when the first container is vented to atmosphere.

3. The apparatus of claim 1 in which said filter comprises a receptacle having an opening in its upper portion constructed and arranged to receive fluid flow from said sink drain and a filter tank constructed and arranged to receive fluid flow from the opening in the upper portion of the receptacle, the second conduit means being coupled from the filter tank to the second container and the fourth conduit means being coupled from the filter tank to the first container.

4. The apparatus of claim 3 which further comprises a filter element mounted on the receptacle across the opening in the upper portion of the receptacle, said filter element being constructed and arranged such that fluid passing out of the receptacle through the opening of the receptacle also passes through said filter element.

5. The apparatus of claim 4 in which the receptacle is positioned within the filter tank.

6. The apparatus of claim 5 in which the second conduit means includes first valve means for permitting the coupling of washing fluid only in the direction from the receptacle to the second container and only when compressed air is not coupled to the second container, and in which the fourth conduit means includes second valve means for permitting the coupling of washing fluid only in the direction from the receptacle to the first container and only when compressed air is not coupled to the first container

7. The apparatus of claim 1 additionally comprising a pair of sideboards mounted on said apparatus above said sink and sloping toward said sink and constructed and arranged to guide solvent on the sideboards into the sink.

8. The apparatus of claim 7 additionally comprising a hose having an outlet end positioned to discharge above said sink and sideboards for washing parts in said sink and on said sideboards, said hose having an inlet end, said first conduit means including third valve means constructed and arranged to permit flow of washing fluid only in a direction away from said first container, said third conduit means including fourth valve means constructed and arranged to permit flow of washing fluid only in a direction away from said second container, said first conduit means and said third conduit means being coupled to the inlet end of said hose through said third valve means and said fourth valve means to provide washing fluid to said hose from either said first conduit means or said third conduit means.

* * * * *

UNITED STATES PATENT OFFICE

CERTIFICATE OF CORRECTION

Patent No. 3,970,560 Dated July 20, 1976

Inventor(s) Herman U. Metzger

It is certified that error appears in the above-identified patent and that said Letters Patent are hereby corrected as shown below:

Column 5 Line 13 "arrested" should be--associated

Column 5 Line 23 "aS" should be--as

Signed and Sealed this

Fourteenth Day of September 1976

[SEAL]

*Attest:*

RUTH C. MASON
*Attesting Officer*

C. MARSHALL DANN
*Commissioner of Patents and Trademarks*